Patented Aug. 22, 1939

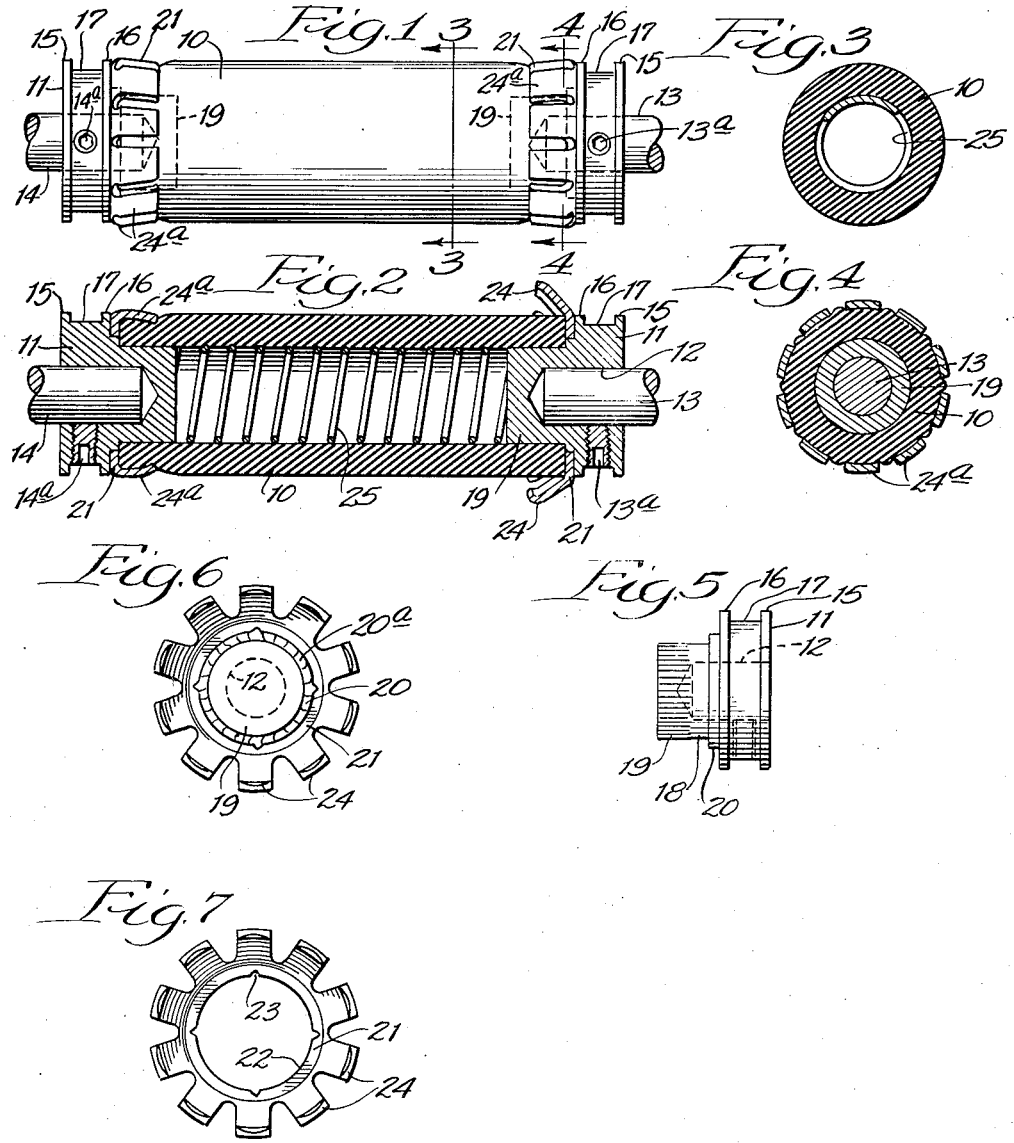

2,170,627

UNITED STATES PATENT OFFICE 2,170,627

FLEXIBLE COUPLING FOR SHAFTS

Harry H. Berryman, Chicago, Ill.

Application April 4, 1938, Serial No. 199,811

2 Claims. (Cl. 64—11)

An object of this invention is to provide a simple and efficient coupling for shafts which are in substantially axial alignment and particularly where the power transmitted is small as in oil burners, washing machines and the like.

Heretofore, flexible couplings have been made with the resilient or yieldable element, of rubber, but for many purposes such couplings have not been used where oil was present on one or both of the shafts because of the danger of the oil coming in contact with the rubber and disintegrating it.

Another object therefore is to provide a flexible coupling containing rubber which will operate successfully where one or both shafts are covered with oil.

These and other objects, as will hereinafter appear, are accomplished by this invention which is fully described in the following specification and shown in the accompanying drawing, in which—

Figure 1 is a front elevation of a coupling embodying the invention;

Fig. 2 is a longitudinal section through the same;

Figs. 3 and 4 are sections on the lines 3—3 and 4—4 respectively of Fig. 1;

Fig. 5 is a side elevation of one of the end metal bodies;

Fig. 6 is a front elevation of one of the end metal bodies with a fingered clamping member secured thereto; and Fig. 7 is a front elevation of one of the fingered clamping members.

The flexible coupling in the embodiment illustrated comprises essentially a rubber sleeve 10 having firmly secured to its two ends aligned metal bodies 11, 11. Each of the bodies is accurately drilled to provide an axial opening 12 which is adapted to snugly fit a shaft as 13, 14 and to which it is clamped by means of a set screw 13ª. Care is taken in this instance that the hole 12 shall not go entirely through the body 11 so as to prevent the flow to the interior of the coupling of any oil which may be present on either of the shafts. In this way, oil is prevented from leaking into the coupling where it could reach and destroy the sleeve 10 which preferably is composed partly or wholly of rubber.

The body 11 is provided with spaced flanges 15 and 16. Any oil passing along the shaft as the coupling is rotated will reach the end of the body and will be thrown by centrifugal force out along the outer end of the body where it will be thrown away from the shaft by means of the flange 15 thereby insuring that this oil will not find its way to the rubber sleeve 10. Between these flanges is a depression 17 which will ordinarily prevent any oil passing from the flange 15 to the flange 16. Should any oil, however, reach the flange 16, it too will be thrown out by centrifugal force away from the shaft thereby acting as a second means for preventing oil reaching the rubber portion of the coupling.

The body 11 has a reduced central portion 18 adapted to fit into an end of the rubber sleeve 10 and is knurled at 19 to increase the friction between the reduced portion 18 and the sleeve. The body is provided with a shouldered portion 20 and this is adapted to receive a clamping plate 21 (Fig. 7) which has a notched opening 22 adapted to fit over the shoulder, the notches 23 being preferably several in number. After assembly of this plate on the shoulder portion 20, the latter is hammered or riveted over as indicated at 20ª (Fig. 6) so as to drive some of the material of the portion 20 into the notches 23, and at the same time forcing it out firmly into engagement with the edges of the opening 22 so as to prevent rotation of the clamping plate with respect to the metal body. This plate is provided with a series of fingers 24 which extend inwardly over the rubber tube 10 as shown at the right hand end of Fig. 2.

The fingers 24 are then bent or hammered down into the position 24ª as shown at the left hand end of Fig. 2 thereby firmly gripping the end of the rubber tube between these fingers and the reduced knurled portion 19 of the body.

A helical spring 25 is preferably located within the sleeve 10 during the operation of assembling the metal bodies therein and this spring is preferably placed under compression so as to urge the bodies outwardly thereby maintaining the sleeve under a slight tension. This spring serves to prevent any tendency of the sleeve to collapse or buckle when it is subjected to a heavy torsional stress.

In actual practice, this coupling has been found to be noiseless and efficient even when the shafts to be coupled are out of alignment. Tests have shown that oil traveling along one or other of the shafts will be thrown off completely and that none of this oil will be able to pass beyond the second flange 16 and on to the rubber sleeve.

While I have shown and described but a single embodiment of my invention, it is to be understood that it is capable of many modifications. Changes, therefore, in the construction and arrangement may be made which do not depart from the spirit and scope of the invention as defined in the appended claims.

I claim:

1. A flexible coupling for shafts comprising spaced aligned metal bodies adapted to receive the ends of shafts to be coupled and having reduced portions on the facing ends, a resilient sleeve surrounding and connecting said reduced portions, and a helical spring slidably enclosed within the sleeve and under endwise compression so as to maintain the sleeve under tension and to prevent its buckling under torsion.

2. A flexible coupling for shafts comprising spaced aligned metal bodies adapted to receive the ends of shafts to be coupled, means for securing the bodies to said shafts, the bodies having reduced facing ends, a rubber sleeve surrounding and connecting said ends, and a helical spring under endwise compression slidably enclosed within the sleeve and having a frictional engagement with the metal bodies tending to keep the sleeve under tension.

H. H. BERRYMAN.